United States Patent [19]

Robbins

[11] Patent Number: 5,026,013

[45] Date of Patent: Jun. 25, 1991

[54] SUPPORT POST MOUNTING ASSEMBLY

[75] Inventor: Tom E. Robbins, San Leandro, Calif.

[73] Assignee: Kallista, Inc., San Leandro, Calif.

[21] Appl. No.: 408,169

[22] Filed: Sep. 15, 1989

[51] Int. Cl.$^5$ ............................................. A47H 1/14
[52] U.S. Cl. ................................. 248/223.1; 248/251; 248/222.1
[58] Field of Search ............... 248/223.1, 223.2, 222.4, 248/251, 222.1, 223.4

[56] References Cited

U.S. PATENT DOCUMENTS

| | | |
|---|---|---|
| 1,045,898 | 12/1912 | Shaw . |
| 2,088,320 | 7/1937 | De Vries . |
| 2,176,644 | 10/1939 | Sladek .............................. 248/222.1 |
| 2,269,847 | 1/1942 | Feinson ............................ 248/223.4 |
| 2,402,127 | 6/1946 | Cohn . |
| 2,956,767 | 10/1960 | Unetic ................................ 248/251 |
| 3,211,409 | 10/1965 | Zimmermann ............. 248/223.1 X |
| 3,487,446 | 12/1969 | Hero et al. . |
| 4,498,654 | 2/1985 | Cooper ................................ 248/251 |
| 4,783,034 | 11/1988 | Ostrander et al. . |

Primary Examiner—Alvin C. Chin-Shue
Attorney, Agent, or Firm—Quarles & Brady

[57] ABSTRACT

An assembly is disclosed for mounting a bathroom accessory support post to a wall. A bracket with a mounting hole in the form of a keyhole slot is attached to the wall. A support post for the accessory has a neck and an enlarged head at the end of the neck. Adjacent the neck, the support post is threaded to receive a jamb nut. The enlarged head of the support post is positionable within the keyhole slot. The jamb nut is rotatable to clamp the bracket between the enlarged head and the jamb nut to retain the head within the keyhole slot. A cover is friction fit with the aid of an O-ring against the bracket to conceal the mounting hardware from view during use.

4 Claims, 2 Drawing Sheets

SUPPORT POST MOUNTING ASSEMBLY

FIELD OF THE INVENTION

This invention relates to a mounting assembly for a support post. More particularly, it pertains to a concealable assembly for rigidly mounting a post to a wall, where the post can support a towel bar or other wall-mountable structure.

BACKGROUND OF THE INVENTION

Many bathroom accessories and other structures such as shelves and mirrors are commonly mounted on walls. The assemblies for mounting such structures preferably have several characteristics. First, the mounting assemblies should provide a solid mounting. In this regard, mounting assemblies for shelves and mirrors must sometimes support a considerable weight, and assemblies for towel and grab bars are often subjected to large multi-directional forces. Second, to be aesthetically pleasing (and to reduce the risk of vandalism), the mounting assembly should conceal the method of mounting (such as as screws, washers, springs, etc.). Further, assemblies should incorporate an uncomplicated structure that permits relatively fast and simple mounting of the bathroom accessory or other structure and relatively inexpensive manufacture.

These requirements often conflict, however, and present mounting assemblies have not satisfactorily fulfilled the requirements. For example, some assemblies employ special parts that are designed to provide a sturdy construction. (See for example, the screw-pin incorporating a spring-urged detent in U.S. Pat. No. 2,088,320). Such special parts, through, often increase the cost and complexity of the mounting assembly, and sometimes provide a source of assembly malfunction. Other mounting assemblies require special tools to remove the bathroom accessory from the wall. (See U.S. Pat. No. 3,211,409). Thus, a need exists for an improved mounting assembly that can quickly and easily be assembled to provide a sturdy support for a wall-mounted object, with the mounting hardware normally concealed from view.

SUMMARY OF THE INVENTION

The present invention provides an assembly for mounting an accessory support post to a wall. The assembly includes a bracket mountable against a wall. The bracket contains a mounting hole formed by a first hole section and a smaller second hole section. The first hole section is joined to the second hole section. The assembly also includes a jamb nut with internal threads and a support post. The support post in turn has an inward end, an opposite outward end, and a neck formed adjacent said inward end. There is also an enlarged head formed inwardly of the neck. The enlarged head is sized to pass through the first hole section, but not through the second hole section. The neck is positionable within the second hole section after the enlarged head has been inserted through the first hole section.

Threads are formed on the post outwardly of the neck. There are also means for substantially covering the outward and peripheral sides of the jamb nut. Rotation of the jamb nut on the post threads when the neck is positioned in the second hole section can cause the enlarged head to clamp against the bracket. This causes the bracket to be sandwiched between the enlarged head and the jamb nut. This aspect of the invention achieves a solid mounting for the support post, which in turn can be used to hang bathroom accessories, shelves or the like on walls or doors.

Screws can be used to fix the bracket against the wall, and in a preferred form of the mounting assembly, the cover is a shroud that is secured to the bracket by a friction fit with the aid of an O-ring. This aspect of the invention results in the mounting hardware being normally concealed from view to give the assembly an aesthetically pleasing look. The cover can be easily removed to dismantle the assembly or to clean the wall area around the cover and the bracket.

Thus, it is an object of the invention to provide an improved mounting assembly for a post that yields a sturdy support for a bathroom accessory or other wall-mountable structure.

It is another object of the invention to provide a mounting assembly for a support post where the mounting system used to attach the post to the wall or door is normally hidden from view, thus producing an aesthetically pleasing look.

It is another object of the invention to provide a mounting assembly for a support post that does not incorporate specialized parts which may disadvantageously increase the cost, time and complexity of manufacture or installation.

The foregoing and other objects and advantages of the present invention will appear from the following description. In the description, reference will be made to the accompanying drawings which illustrate a preferred embodiment of the present invention. This embodiment does not represent the full scope of the invention. Reference should therefore be made to the claims herein for interpreting the full scope of the invention.

BRIEF DESCRIPTION OF THE DRAWINGS

FIG. 5 is a view in section of the mounting assembly taken along line 5—5 of FIG. 1.

DETAILED DESCRIPTION OF THE PREFERRED EMBODIMENTS

Figure 1:
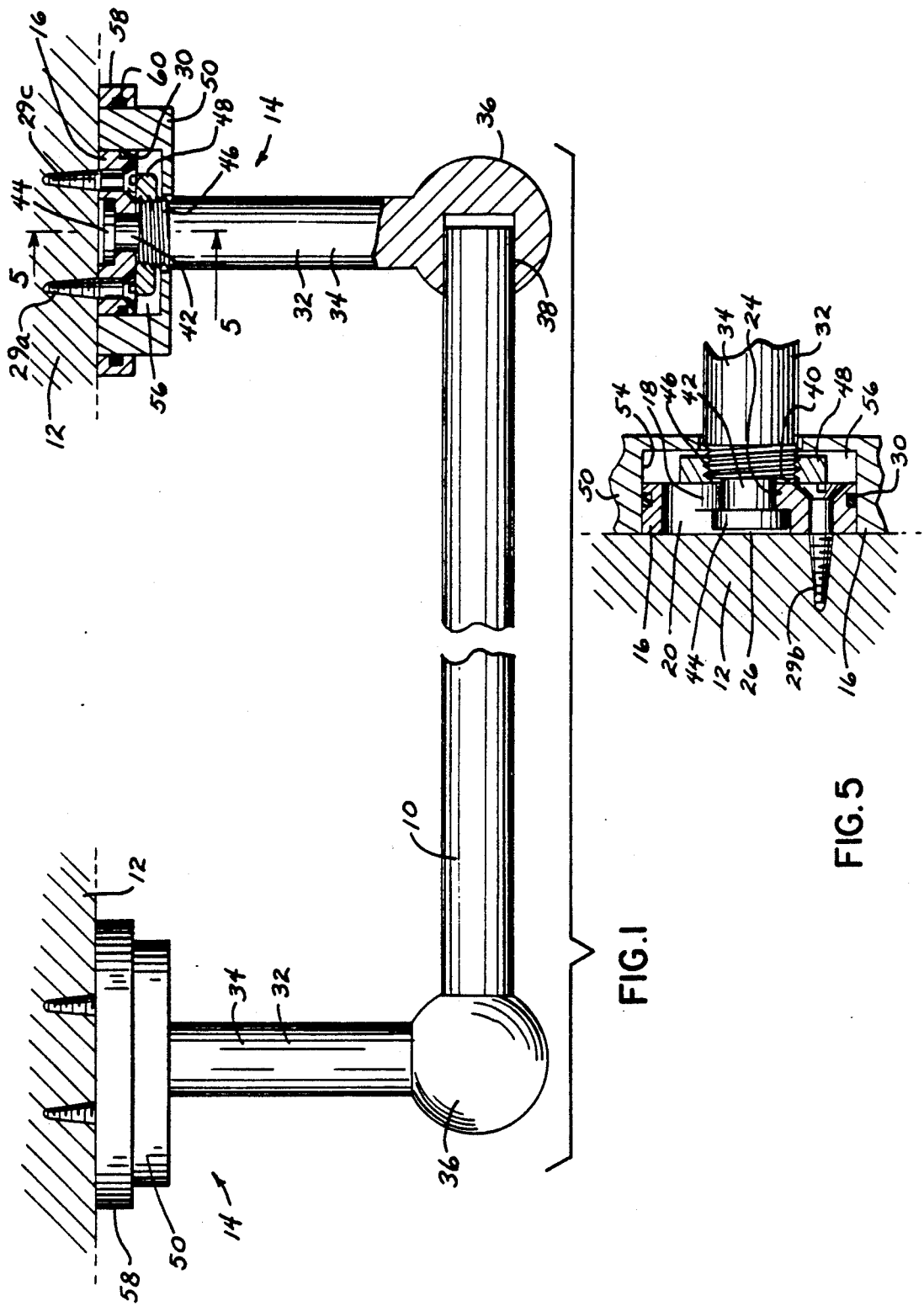
FIG. 1 is a top plan view of a towel bar attached to a wall by a pair of mounting assemblies according to the invention, the central portion of the bar not being shown, with portions of the right hand assembly and the wall shown in horizontal section.

Referring to FIG. 1, a towel bar 10 is shown mounted relative to a wall 12 by a pair of mounting assemblies 14. The mounting assemblies 14 may of course, be used to mount many other types of bathroom or other wall-mountable accessories other than a towel bar 10. For example, the mounting assembly according to the present invention may be used with tissure holders, door pulls and soap dishes.

Figure 2:
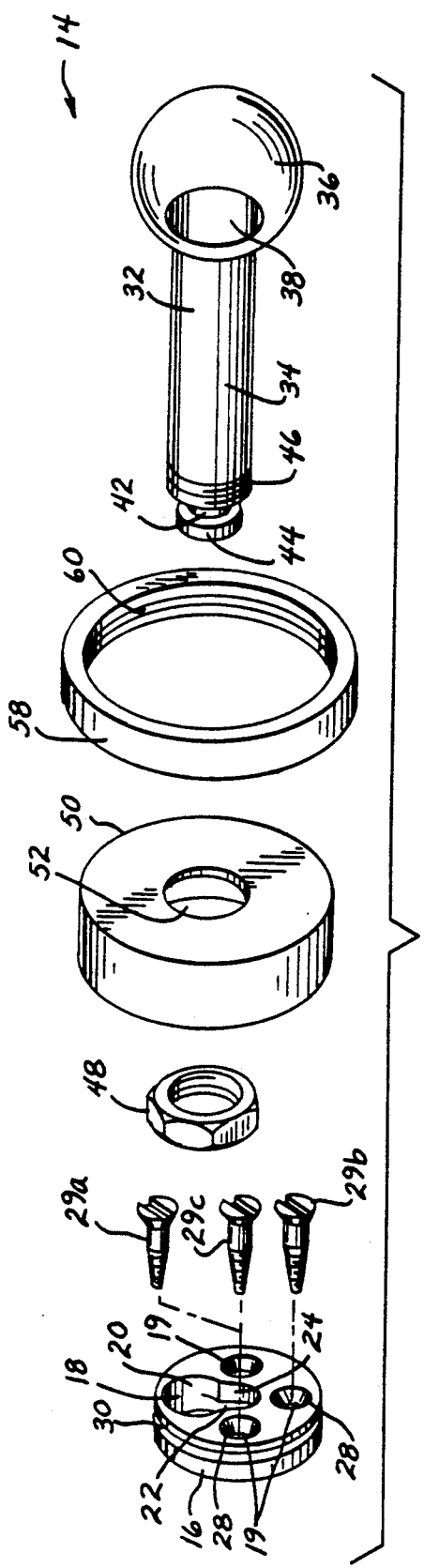
FIG. 2 is an exploded perspective view of the preferred mounting assembly.

Each mounting assembly 14 includes the components shown in FIG. 2. In describing the components, the term "inward" will denote the portion nearest the wall 12 and the term "outward" will have the opposite meaning. A disc-shaped wall bracket 16 has a mounting bore in the form of a keyhole slot 18. The slot 18 includes a first hole section 20 which is generally circular and is located toward the perimeter of the wall bracket 16. The keyhole slot 18 also includes a second hole section 22 that is joined with the first section 20. The second hole section 22 is located toward the center of the bracket 16. Retaining lip 24 is preferably positioned behind the second hole section 22 adjacent the outward face of the bracket 16. With this construction, a pocket 26 (FIGS. 3-5) is formed inward of the retaining lip 24.

The wall bracket 16 also includes three screw holes 19 through the bracket positioned at spaced-apart locations. On the outward face (see FIG. 2) of the bracket 16, the screw holes 19 include tapered portions 28 in order to counter-sink fasteners 29a, 29b and 29c when attaching the bracket 16 to the wall 12. While screw holes 19 and screw-type fasteners 29a, 29b and 29c are shown to illustrate mounting of the bracket 16 to the wall 12, it should be clear that other methods of attaching the bracket 16 to the wall 12 are within the scope of the invention. A wall bracket could, for instance, be formed without screw holes and would then be glued, welded or otherwise suitably fastened to a wall to provide a rigid assembly.

The wall bracket 16 also includes an annular groove (not shown) around the outside of the bracket in which an O-ring 30 is placed. The depth of the groove is such that a portion of the O-ring 30 lies outside the groove, and thus radially beyond the perimeter of the bracket 16. Axially, the groove and the O-ring are positioned adjacent the outward face of the bracket 16.

A mounting post 32 has a generally cylindrical body portion 34 between its inward and outward ends. An accessory mounting ball 36 is located at the outward end of the mounting post 32. The mounting ball 36 is formed with a recess 38 to receive the towel bar 10 (see FIG. 1). The recess 38 can be threaded or slotted as needed. The mounting ball 36 may be replaced by different structures to accommodate other accessories. For instance, a glass holder or a soap dish could be formed on the outward end of the mounting post by placing a through bore through ball 36. Also, the shape of the body portion 34 may be modified for other accessories. The body portion 34 could be formed with a flat surface, for example, to hold a shelf. Thus, someone skilled in the art using mounting assemblies according to the present invention may vary the shape of the body portion 34 and the outward end of the mounting post 32 to mount any particular type of bathroom accessory or other wall-mounted structure.

Figure 4:
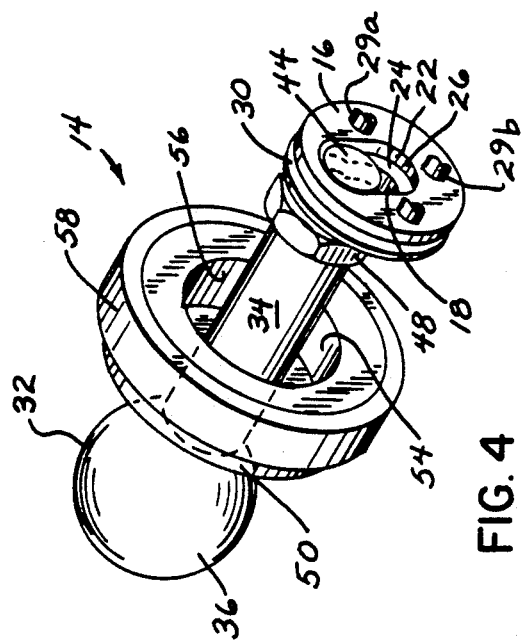
FIG. 4 is a perspective view similar to FIG. 3, but showing the mounting assembly in a further partially assembled stage.
Figure 3:
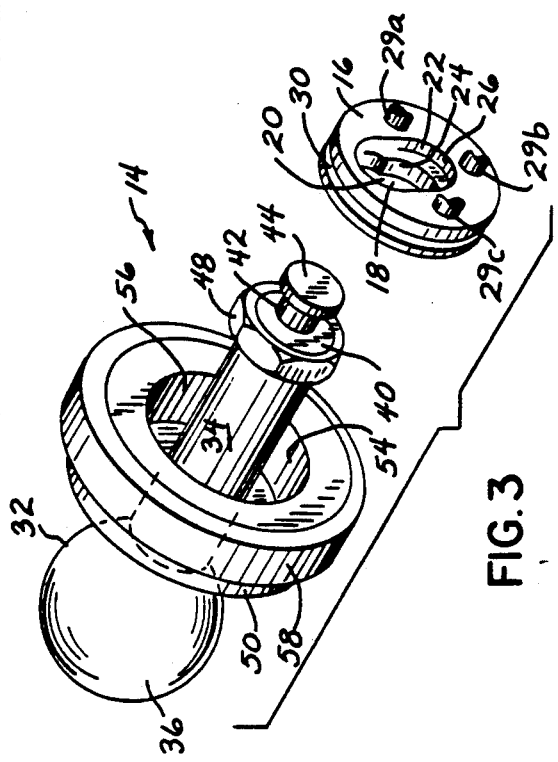
FIG. 3 is a perspective view of the FIG. 2 mounting assembly in a partially assembled stage.

The inward end of the body portion 34 has a shoulder region 40 (FIGS. 3-5). A neck 42 extends inward from the shoulder 40 and terminates with an enlarged head 44. The diameter of the enlarged head 44 can be smaller than the diameter of the body portion 34. The head 44 is also sized to fit through the first hole section 20 of the keyhole slot 18. With regard to the second hole section 22 of the keyhole slot 18, the enlarged head 44 is sized to fit within the pocket 26. The enlarged head 44 cannot, though, fit within the narrower diameter of the second hole section 22 that is formed by the retaining lip 24 (at the outward face of the wall bracket 16).

The neck 42 of the mounting post 32, on the other hand, has a smaller diameter than that of the second hole section 22 that is formed by the retaining lip 24 (adjacent the outward face of the wall bracket 16). Additionally, the axial length of the neck 42 (distance from the enlarged head 44 to the shoulder 40) is slightly greater than the width of the retaining lip 24. In this way, if the enlarged head 44 is inserted into the first hole section 20 with the shoulder 40 abutting the outward face of the wall bracket 16, the neck 42 can be moved into the second hole section 22 (within the retaining lip 24). Such movement causes the enlarged head 44 to seat in the pocket 26.

Outward from the shoulder 40, the body portion 34 of the mounting post 32 is formed with external threads 46 (See FIG. 1). A jamb nut 48 having internal threads is adapted to rotatively and threadably engage the external threads 46. The enlarged head 44 may pass through the jamb nut 48. Thus, the jamb nut 48 may be positioned over the shoulder of the body portion 34 to engage the threads 46. The threads 46 extend outward from the shoulder 40 a sufficient distance to allow the jamb nut 48 to be outward of the shoulder 40 when the jamb nut 48 is fully rotated in the outward direction.

The mounting assembly 14 also includes a first shroud or cover 50 having a central opening 52 (see FIG. 2). The central opening 52 is slightly larger than the diameter of the body portion 34 of the mounting post 32. In this way, the body portion 34 can be inserted into the central opening 52 when the jamb nut 48 is not engaged with the threads 46.

As best seen in FIGS. 3-5, the inward side of the cover 50 is formed with an interior annular wall 54 which creates a recess 56. The recess 56 is sized so that the wall bracket 16 can snugly fit inside the recess 56 with the O-ring 30 providing a tight friction fit between the bracket 16 and the interior wall 54 of the cover 50. The interior wall 54 is preferably formed with sufficiently axial length to envelop the bracket 16 even with the jamb nut 48 sandwiched in the recess 56 between the bracket 16 and the cover 50. If desired, a side set screw (not shown) can be used in place of the O-ring 30.

As an optional feature, the mounting assembly 14 is also illustrated with a second decorative ring 58. An interior groove (not shown) in the decorative ring 58 holds an O-ring 60 (see FIGS. 1 and 2), which is made of a pliable material such as plastic or rubber. The decorative ring 58 is sized to encircle the cover 50 with the O-ring 60 providing a snug friction fit holding the decorative ring 58 in place relative to the cover 50.

To use the mounting assembly 14 to support a bathroom accessory or other wall-mounted structure, the wall bracket 16 is first secured to the wall 12 with suitable fasteners 29a, 29b and 29c. The bracket 16 should be positioned with the first hole section 20 on top and the screw hole 19 corresponding to fastener 29b on the bottom. Also, the tapered portions 28 of the screw holes 19 should be positioned away from (outward) the wall. With the wall bracket 16 in this position, the retaining lip 24 of the keyhole slot 18 is facing outward and the pocket 26 is positioned against the wall.

Before threading the jamb nut 48 onto the threads 46, the enlarged head 44 of the mounting post 32 should be inserted through the central opening 52 of the cover 50. The cover 50 is then positioned around the body portion 34 of the post 32 as shown in FIG. 3. Note that the recess 56 should face inward. At this point, the optional decorative ring 58 may be positioned around the cover 50. The internal O-ring 60 will hold the ring 58 in place around the cover 50.

The jamb nut 48 is then fully threaded onto the mounting post 32 as shown in FIG. 3. When fully threaded, the jamb nut 48 is located slightly outward from, or flush with, the shoulder 40. With the jamb nut 48 engaged with the external threads 46, the cover 50 is prevented from sliding off the inward end of the mounting post 32 (provided the central opening 52 is not larger than the jamb nut 48).

At this stage of the assembly, the towel bar 10 should be inserted between a pair of mounting assemblies 14. Each end of the towel bar 10 is inserted into the cavities 38 of opposing mounting balls 36 (FIG. 1). The towel bar 10 may be glued or otherwise secured within the cavities 38 if desired. A pair of wall brackets 16 corresponding to the pair of mounting assemblies 14 should be spaced apart to properly accept the pair of assemblies 14 which are spaced apart by the captured towel bar 10. For wall-mounted structures not requiring two mounting assemblies 14 (e.g., shelf support arm, robe hook, etc.), this step is not required. Further, other accessories not requiring two mounting assemblies 14 (e.g., soap and glass holders) may be attached to a mounting post after the post has been fastened to the wall bracket 16, as will now be described.

The mounting post 32 (with the cover 50, decorative ring 58 and jamb nut 48 in place as shown in FIG. 3) is then moved toward the wall bracket 16 so that the enlarged head 44 passes through the first hole section 20 of the keyhole slot 18. This stage of assembly is illustrated by FIG. 4. The larger diameter shoulder 40 (FIG. 3) does not pass through the first hole section 20, but instead stops further movement toward the wall 12 (not shown in FIGS. 3 and 4) as the shoulder 40 abuts the wall bracket 16.

The mounting post 32 should then be lowered so that the neck 42 slides into the second hole section 22 of the keyhole slot 18 (within the retaining lip 24). Correspondingly, the enlarged head 44 moves into the pocket 26 located inward of retaining lip 24. The enlarged head 44 and the shoulder 40 are thus positioned inward and outward, respectively, of the retaining lip 24.

Jamb nut 48 is then rotated inward on threads 46 to draw the enlarged head 44 against the inward side of the retaining lip 24 (see FIG. 5). In this way, the wall bracket 16 is sandwiched between the enlarged head 44 and the jamb nut 48. This pressed engagement prevents the enlarged head 44 from moving from the pocket 26 to the first hole section 20 of the keyhole slot 18. Also, because the bracket 16 is mounted on the wall 12 with the first hole portion 20 above the second hole portion 22, gravity tends to prevent the enlarged head 44 from moving out of the pocket 26. This design further prevents the fasteners 29a, 29b and 29c from coming out of the screw holes 19 because they are trapped by the position of the jamb nut 48 (See FIG. 1).

The cover 50 (with the attached decorative ring 58) is then slid inward along the mounting post 32 into the position as shown in FIG. 1. The cover 50 can be pressed against the wall 12 and will be held in place due to the friction fit caused by the external O-ring 30 of the wall bracket 16. With the cover 50 in this position against the wall 12, the bracket 16, mounting screws 29a, 29b and 29c and jamb nut 48 are all concealed from view within the recess 56 of the cover 50 (See FIGS. 1 and 5).

The foregoing detailed description has been for the purpose of illustration. Thus, a number of modifications and changes may be made without departing from the spirit and scope of the present invention. For example, the wall bracket 16 and cover 50 could be designed in another shape, such as a square (with a corresponding modification to the O-ring 30). Therefore, the invention should not be limited by the specific embodiments described, but only by the claims.

I claim:

1. An assembly for mounting an accessory support post to a wall, comprising:
    a bracket mountable against the wall, said bracket having a mounting hole formed by a first hole section and a smaller second hole section, said first hole section being joined to said second hole section;
    a jam nut having internal threads;
    a support post having:
        (a) an inward end;
        (b) an opposite outward end;
        (c) a neck formed adjacent said inward end;
        (d) an enlarged head formed inwardly of said neck, said enlarged head being sized to pass through said first hole section but not said second hole section, and said neck positionable within said second hole section after said enlarged head has been inserted through said first hole section; and
        (e) threads on said post formed outwardly of said neck;
    a shroud secured to said bracket by a first friction fit between the inside of said shroud and a peripheral surface of said bracket, said first friction fit due to an O-ring positioned between said shroud and said bracket, said shroud substantially covering the outward and peripheral sides of both said jam nut and said bracket; and
    a decorative member positioned around said shroud and held in place by a second friction fit;
    whereby rotation of said jam nut on said post threads when said neck is positioned in said second hole section can cause said enlarged head to clamp against said bracket.

2. The assembly according to claim 1, wherein said bracket has at least one screw hole for mounting said bracket to the wall.

3. The assembly according to claim 1, wherein said second friction fit is assisted by an O-ring positioned between said shroud and said decorative member.

4. The assembly according to claim 1, wherein said bracket has an inward recess pocket suitable to receive said head when said bracket is mounted against the wall.

* * * * *